US008799822B2

(12) United States Patent
Shimizu

(10) Patent No.: US 8,799,822 B2
(45) Date of Patent: Aug. 5, 2014

(54) INFORMATION PROCESSING APPARATUS, AND DISPLAY CONTROL METHOD

(75) Inventor: Tomoyuki Shimizu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 695 days.

(21) Appl. No.: 12/271,085

(22) Filed: Nov. 14, 2008

(65) Prior Publication Data

US 2009/0132965 A1    May 21, 2009

(30) Foreign Application Priority Data

Nov. 16, 2007    (JP) .................................. 2007-298597

(51) Int. Cl.
*G06F 3/048* (2013.01)
*G06F 3/00* (2006.01)

(52) U.S. Cl.
CPC .. G06F 3/048 (2013.01); *G06F 3/00* (2013.01)
USPC ........... 715/853; 707/778; 707/786; 707/829; 715/764; 715/469

(58) Field of Classification Search
CPC .................................. G06F 3/048; G06F 3/00
USPC ........................... 715/853; 707/778, 786, 829
See application file for complete search history.

(56) References Cited

U.S. PATENT DOCUMENTS

| | | | | |
|---|---|---|---|---|
| 7,075,550 | B2 * | 7/2006 | Bonadio ........................ | 345/589 |
| 8,060,833 | B2 * | 11/2011 | Zagorski ........................ | 715/769 |
| 2005/0114672 | A1 * | 5/2005 | Duncan et al. ................. | 713/182 |
| 2007/0027873 | A1 * | 2/2007 | Factor et al. ....................... | 707/9 |
| 2007/0071416 | A1 * | 3/2007 | Ikemizu ......................... | 386/117 |
| 2007/0084370 | A1 * | 4/2007 | Kuroda ........................ | 101/404 |
| 2007/0294231 | A1 * | 12/2007 | Kaihotsu ........................... | 707/3 |
| 2008/0027940 | A1 * | 1/2008 | Canning et al. ................... | 707/9 |
| 2009/0070291 | A1 * | 3/2009 | Tadayon et al. .................... | 707/2 |
| 2009/0119298 | A1 * | 5/2009 | Faitelson et al. .................. | 707/9 |

FOREIGN PATENT DOCUMENTS

| | | | | |
|---|---|---|---|---|
| JP | 2005-141351 | * | 2/2005 | ............. G06F 12/00 |
| JP | 2005-141351 | A | 6/2005 | |
| JP | 2005-141351 | A | 6/2005 | |
| JP | 2007-280125 | A | 10/2007 | |
| JP | 2007280125 | A | * 10/2007 | |

OTHER PUBLICATIONS

Eder et al, Self-maintained Folder Hierarchies as Document Repositories; © 2001; IEEE; 8 pages.*
Cole§a et al., A Meta-Data Enhanced File System; © 2007, IEEE; 4 pages.*

* cited by examiner

*Primary Examiner* — Linh K Pham
(74) *Attorney, Agent, or Firm* — Carter, DeLuca, Farrell & Schmidt, LLP

(57) ABSTRACT

Embodiments of the invention are directed to a display control method in an information processing apparatus, which can display a hierarchical structure of folders, which can classify and store electronic files according to attribute information, using folder names based on attribute information. The method includes specifying a folder to be displayed and electronic files classified to the folder in response to an instruction from a user, determining whether or not the specified folder includes electronic files, access rights of which are granted to the user. The method also includes controlling display of the specified folder when the specified folder includes electronic files, the access rights of which are granted to the user, and controlling hiding of the specified folder when the specified folder does not include any electronic files, the access rights of which are granted to the user.

8 Claims, 10 Drawing Sheets

FIG. 3

| | 301 | 301 ATTRIBUTE INFORMATION | 301 | 301 |
|---|---|---|---|---|
| | FILE NAME | PROJECT NAME | CREATOR | DATE OF CREATION |
| 302 | SCHEDULE | PROJECT X | AAA | JANUARY 21 |
| | MINUTES 070122 | PROJECT X | BBB | JANUARY 22 |
| | RESEARCH REPORT 0210 | PROJECT Y | CCC | FEBRUARY 10 |
| | EXAMINATION RESULT 070218 | PROJECT X | BBB | FEBRUARY 18 |
| | SPECIFICATION (PLAN) | PROJECT Z | CCC | FEBRUARY 25 |
| | PROJECT OVERVIEW | PROJECT Z | AAA | FEBRUARY 27 |
| | ... | | | |

F I G. 5

| FILE NAME | ATTRIBUTE INFORMATION ||| ACCESS RIGHT |||
|---|---|---|---|---|---|---|
| | PROJECT NAME | CREATOR | DATE OF CREATION | AAA | CCC | BBB |
| SCHEDULE | PROJECT X | AAA | JANUARY 21 | ○ | × | ○ |
| MINUTES 070122 | PROJECT X | BBB | JANUARY 22 | ○ | × | ○ |
| RESEARCH REPORT 0210 | PROJECT Y | CCC | FEBRUARY 10 | ○ | ○ | × |
| EXAMINATION RESULT 070218 | PROJECT X | BBB | FEBRUARY 18 | ○ | × | ○ |
| SPECIFICATION (PLAN) | PROJECT Z | CCC | FEBRUARY 25 | ○ | ○ | × |
| PROJECT OVERVIEW | PROJECT Z | AAA | FEBRUARY 27 | ○ | ○ | × |
| . . . | | | | | | |

○ : ACCESS RIGHT GRANTED
× : NO ACCESS RIGHT GRANTED

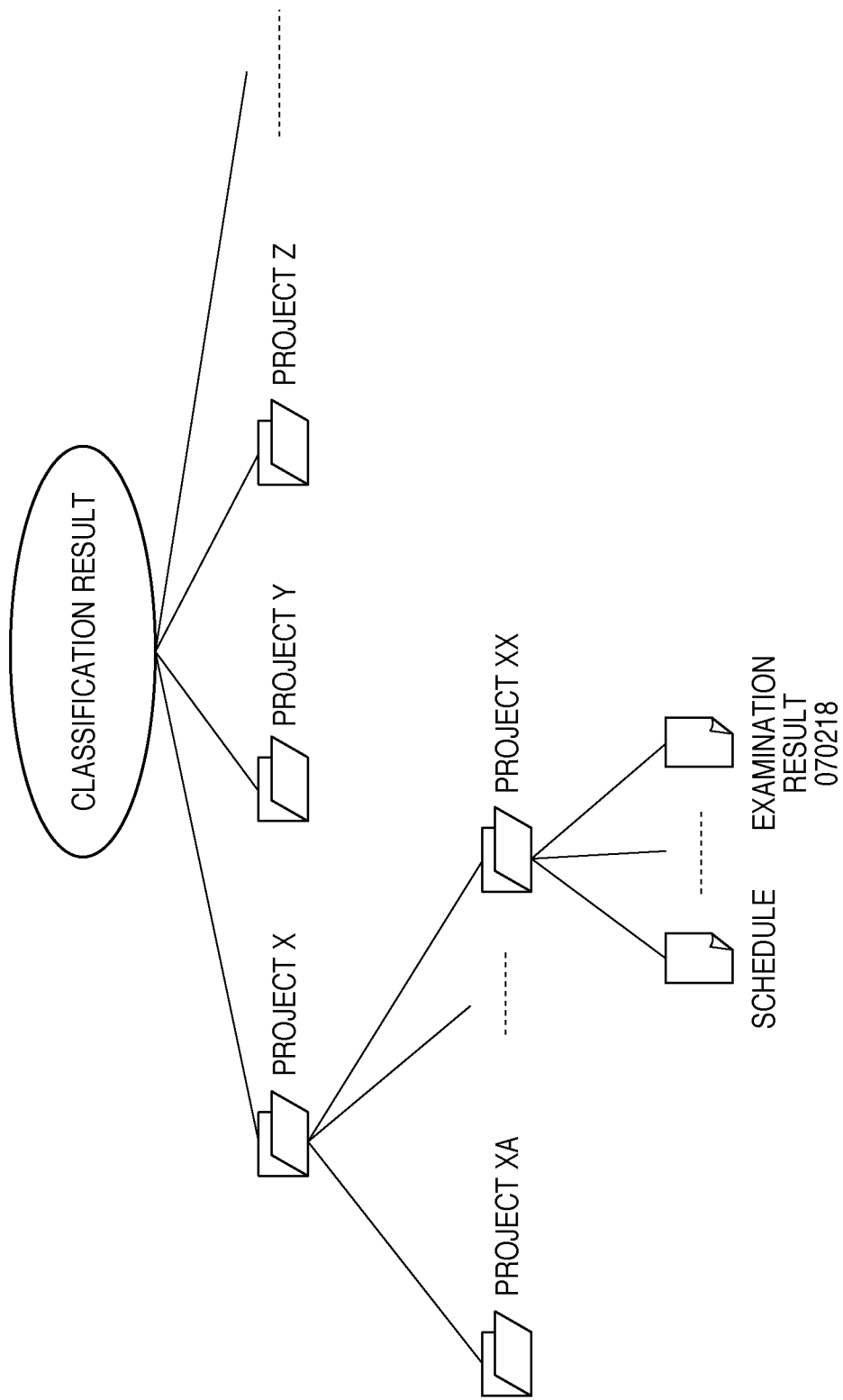

INFORMATION PROCESSING APPARATUS, AND DISPLAY CONTROL METHOD

BACKGROUND OF THE INVENTION

1. Field of the Invention

Aspects of the present invention relate to a display control technique for displaying folders used to classify electronic files, and an information processing apparatus for use therewith.

2. Description of the Related Art

In recent years, data of electronic documents, photographs, videos, music, and the like (electronic files) are increasingly being handled along with the popularization of devices that can generate and store these electronic files.

These electronic files may generally be shared on small-scale networks in home or offices, on middle-scale networks across a plurality of offices, or on the Internet, and may be accessible by a large number of users.

In general, in order to share electronic files in a network, users having the right to access the electronic files (to be referred to as access rights hereinafter) are set via a file management system. This may be done to ensure the security of the electronic files to be shared, and to protect privacy.

When a user who has no access right attempts to access a electronic file set with an access right, the file management system generally may execute a display control to hide information associated with that electronic file.

In Japanese Patent Laid-Open No. 2005-141351, upon managing electronic files using folders having a hierarchical structure, access rights are allowed to be set for respective electronic files or folders, thus hiding information associated with electronic files.

In the case of Japanese Patent Laid-Open No. 2005-141351, since access rights can also be set for respective folders, even when a folder name based on attribute information of electronic files is given to each folder, the attribute information of electronic files can be prevented from leaking due to that folder name.

However, when the access rights are allowed to be set for respective electronic files and folders as in Japanese Patent Laid-Open No. 2005-141351, the operation load on an administrator who sets these access rights may be heavy.

In the case of a file management system that automatically generates a folder based on attribute information of electronic files, and classifies the electronic files, a folder that is dynamically generated in response to a display instruction of the user typically cannot be hidden in the first place.

SUMMARY OF THE INVENTION

In one embodiment, an information processing apparatus according to the present invention has the following arrangement. That is, an information processing apparatus, which can display a hierarchical structure of folders, which can classify and store electronic files according to attribute information appended to the electronic files, using folder names based on attribute information appended to electronic files classified in the folders, is provided. The apparatus includes a specifying unit configured to specify a folder to be displayed and electronic files classified to the folder in response to an instruction from a user;
a determination unit configured to determine whether or not the folder specified by the specifying unit includes electronic files, access rights of which are granted to the user; and
a control unit configured to control display of the folder specified by the specifying unit when the determination unit determines that the specified folder includes electronic files, the access rights of which are granted to the user, and to control hiding of the folder specified by the specifying unit when the determination unit determines that the specified folder does not include any electronic files, the access rights of which are granted to the user.

According to one aspect of the present invention, in a system that can generate folders based on attribute information of electronic files, the situation where attribute information of electronic files is leaked via the generated folders can be avoided.

In one embodiment, even when access rights are not set for respective folders, folders can be hidden.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain aspects of the invention.

FIG. 3 is a view showing an example of attribute information of an electronic file group 113 managed by an electronic file management unit 201;

FIG. 5 is a view showing an example of access rights set for the electronic file group 113;

FIG. 10 is a view showing an example of the hierarchical structure of folders generated by the folder generation unit 202.

DESCRIPTION OF THE EMBODIMENTS

Embodiments of the present invention will now be described in detail in accordance with the accompanying drawings.

1. ARRANGEMENT OF INFORMATION PROCESSING APPARATUS

Figure 1:
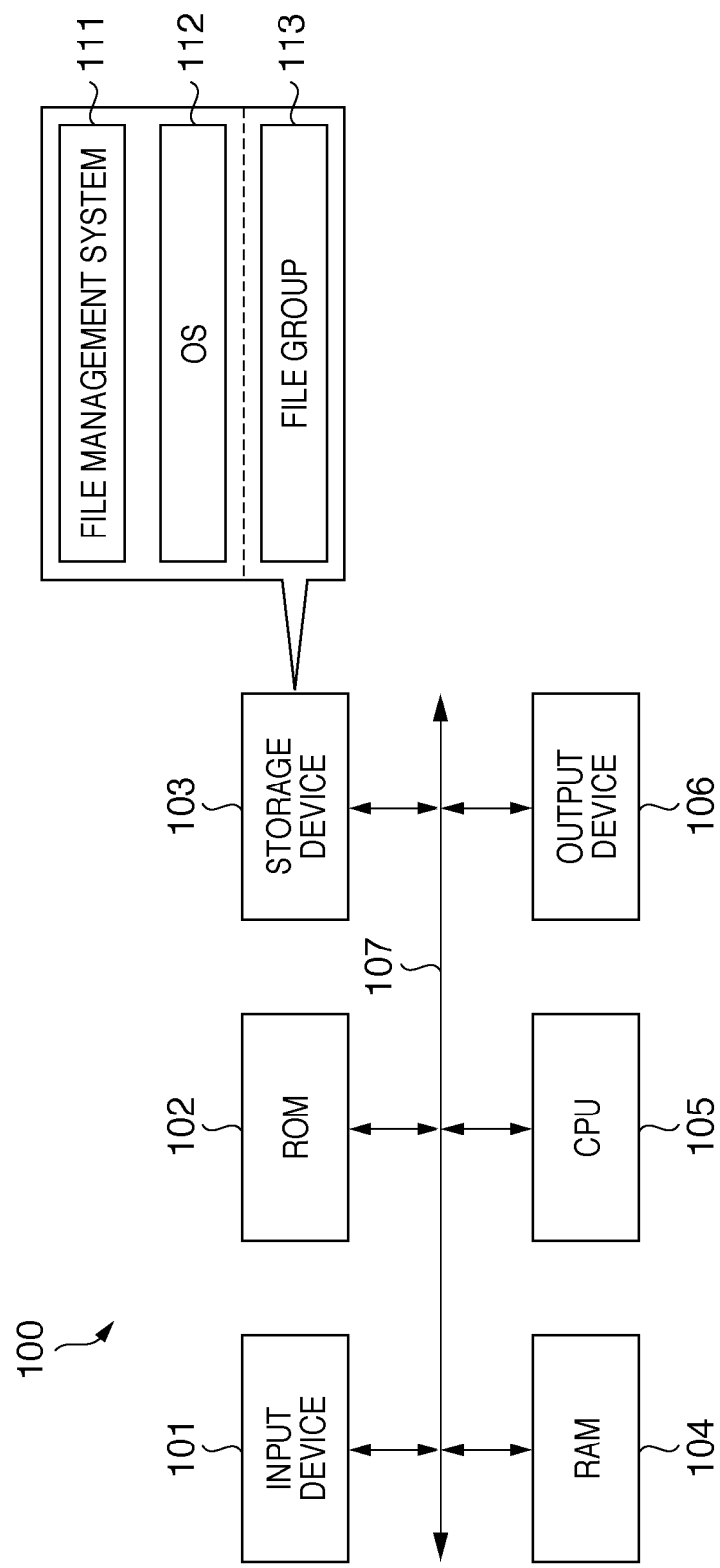
FIG. 1 is a block diagram showing the hardware arrangement of an information processing apparatus 100 according to a first embodiment of the present invention.

FIG. 1 is a block diagram showing the hardware arrangement of an information processing apparatus 100 according to the first embodiment of the present invention.

Referring to FIG. 1, reference numeral 101 denotes an input device which is used to make an operation for issuing a selection instruction of electronic files and folders, and includes, for example, a keyboard, numeric keypad, pointing device, microphone, and the like. Reference numeral 102 denotes a RON that stores programs, parameters, and the like that may not require any change.

Reference numeral 103 denotes a storage device such as, for example, a hard disk, memory card, optical disk, magnetic or optical card, IC card, memory card, or the like, which may be capable of storing, changing, and deleting programs and electronic files. In case of this embodiment, the storage device 103 stores an OS 112, a file management system 111 (to be described later), and a electronic file group 113 which is to be processed by the file management system 111.

Reference numeral 104 denotes a work RAM used upon execution of programs. Reference numeral 105 denotes a CPU that controls execution of various programs stored in the ROM 102 and storage device 103. Reference numeral 106 denotes an output device such as a display or the like, which is capable of outputting the execution results of programs by the CPU 105. Reference numeral 107 denotes a bus that interconnects the respective units 101 to 106 of the information processing apparatus 100 to exchange signals.

2. FUNCTIONAL ARRANGEMENT OF FILE MANAGEMENT SYSTEM 111

Figure 2:
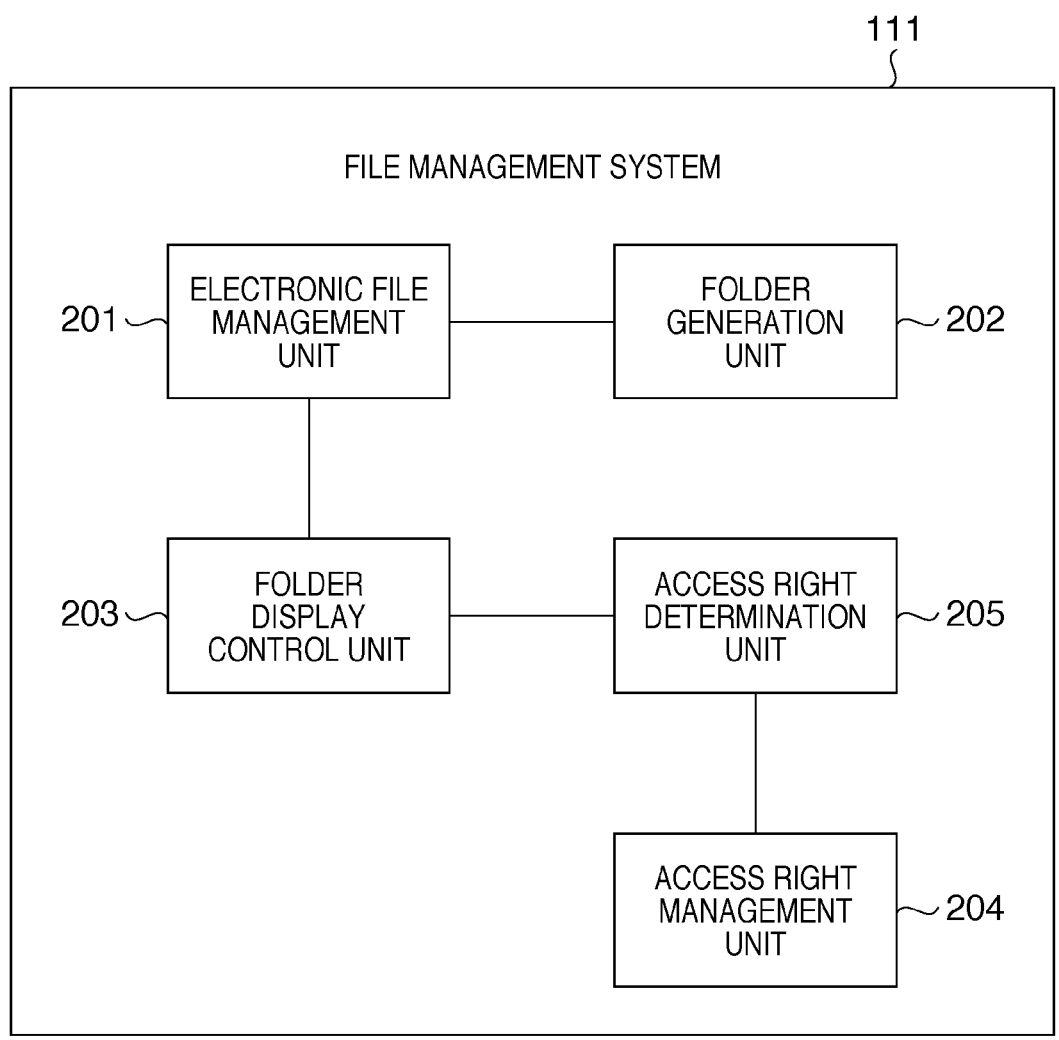
FIG. 2 is a block diagram showing an embodiment of various functions implemented when a CPU 105 executes a file management system 111.

FIG. 2 is a block diagram showing embodiments of various functions implemented when the CPU 105 executes the file management system 111.

As shown in FIG. 2, the file management system 111 comprises an electronic file management unit 201, folder generation unit 202, folder display control unit 203, access right determination unit 205, and access right management unit 204.

Embodiments of detailed functions of the respective units will be described below while presenting examples.

3. DETAILS OF RESPECTIVE UNITS (1) Electronic File Management Unit 201

The electronic file management unit 201 manages attribute information of the electronic file group 113. It is assumed in this example that the attribute information can include an "attribute item" indicating an item of an attribute, and an "attribute value" indicating the contents of the attribute item.

FIG. 3 is a view showing an example of attribute information of the electronic file group 113 managed by the electronic file management unit 201.

In FIG. 3, reference numeral 301 denotes attribute items "file name", "project name", "creator", and "date of creation"; and 302, attribute values of respective electronic files such as "schedule" (file name), "project X" (project name), and the like. Note that FIG. 3 shows an overview of the attribute information of the electronic file group 113 managed by the electronic file management unit 201, and the management format in the electronic file management unit 201 is not limited to the format shown in FIG. 3.

(2) Folder Generation Unit 202

The folder generation unit 202 generates folders used to classify and store the electronic file group 113, the attribute information of which is managed by the electronic file management unit 201, based on the attribute information.

It is assumed that folders generated in this embodiment are "folders" having a hierarchical structure. Upon generation of a folder, the folder generation unit 202 extracts attribute information commonly appended to electronic files which belong to each folder, and automatically assigns a folder name based on the attribute information.

Figure 4:
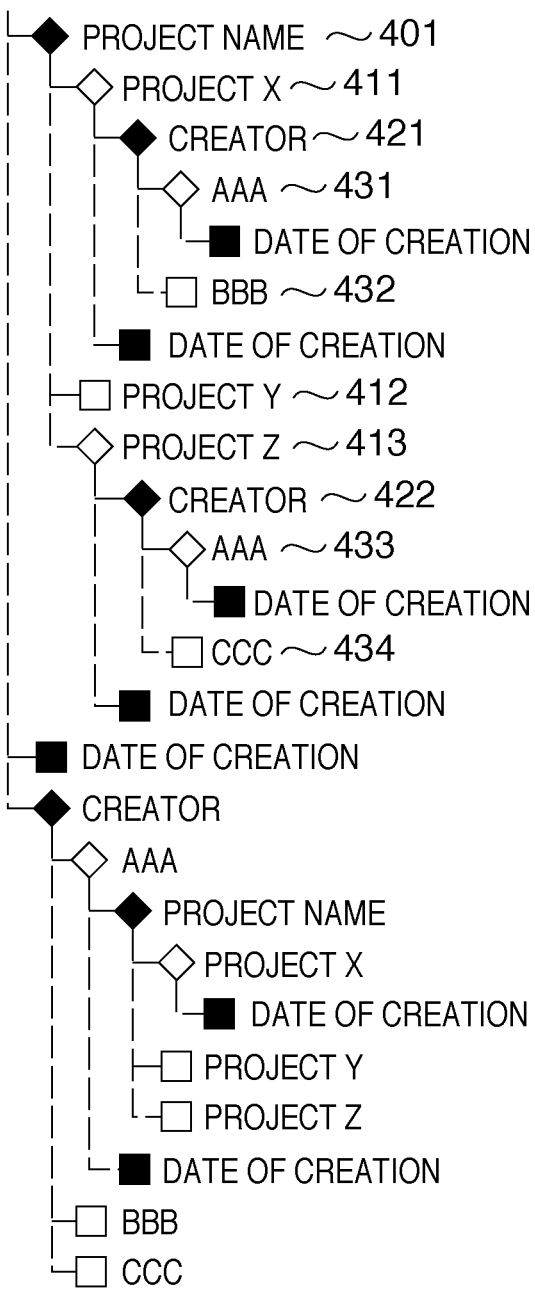
FIG. 4 is a view showing an example of the hierarchical structure of folders generated by a folder generation unit 202.

FIG. 4 is a view showing an example in which the hierarchical structure of folders generated by the folder generation unit 202 is partially expanded. In FIG. 4, folders indicated by full squares (■ or ◆) represent folders to which the attribute items are assigned as their folder names, and those indicated by open squares (□ or ◇) represent folders to which the attribute values are assigned as their folder names. As shown in FIG. 4, in a layer immediately below a folder 401 to which an attribute item "project name" is assigned as its folder name, folders 411 to 413, to which corresponding attribute values "project X", "project Y", and "project Z" are assigned as their folder names, are generated. At this time, in each folder to which the attribute value is assigned as its folder name, electronic files to which attribute information is appended that satisfies a condition "attribute item=attribute value" are virtually allocated.

Furthermore, in a layer under these folders 411 to 413, folders 421 and 422 to which another attribute item "creator" is assigned as their folder names are generated, and folders 431 to 434 respectively assigned with folder names of corresponding attribute values "AAA", "BBB", "AAA" and "CCC" are generated. Subsequently, the hierarchical structure may be configured so that other attribute items and their attribute values are alternately allocated.

Note that the example of FIG. 4 has explained the case in which the attribute items and attribute values are folders of different layers. However, the folders generated by the folder generation unit 202 are not limited to such specific folders. For example, folders to each of which a folder name described in a format "attribute item=attribute value" like "project name: project X" is assigned may be generated.

(3) Access Right Management Unit 204

The access right management unit 204 manages access rights of users to the electronic file group 113. In general, access rights include, for example, rights to refer to electronic files and their attribute information (to be referred to as reference rights hereinafter) and rights to alter electronic files and their attribute information (to be referred to as change rights hereinafter).

However, as described above, in one embodiment, the present invention may avoid attribute information associated with electronic files, the access rights of which are not granted to a given user, from leaking to that user via a folder name of a folder to which the electronic files belong. Therefore, a state in which a given user is not granted any access rights in this specification means at least a state in which that user is not granted rights to access all of the information associated with the files.

FIG. 5 is a view showing an example of access rights set for the electronic file group 113. As shown in FIG. 5, the presence/absence of access rights of users AAA, BBB, and CCC are set for corresponding electronic files.

For example, users AAA and BBB are granted an access right to a electronic file with a file name "schedule", but user CCC is not granted access right to that file.

In the example of FIG. 5, access rights are set for respective users. However, the access rights may be set not only for respective users but also for respective user sets (groups) to which users belong.

In the example of FIG. 5, the presence/absence of access rights is explicitly set. However, the present invention is not limited to such a specific way of discrimination. For example, only the state "no right" may be explicitly set for each user, or a state in which an access right setting has not been made may also be defined as a "no right" state.

That is, a state in which each individual user is granted no access right to an electronic file, and another state need only be distinguishable, and the method of setting access rights is not particularly limited.

(4) Folder Display Control Unit 203 and Access Right Determination Unit 205

Upon receipt of a display request of a certain folder, when a user is granted no access rights to any electronic files that belong to that folder, the folder display control unit 203 executes a display control to hide the folder designated by the received display request.

The access right determination unit 205 determines whether or not access rights are granted to a user upon execution of the display control by the folder display control unit 203.

The sequence of folder display control processing by the folder display control unit 203 and access right determination unit 205 will be described below with reference to FIG. 6.

Figure 6:
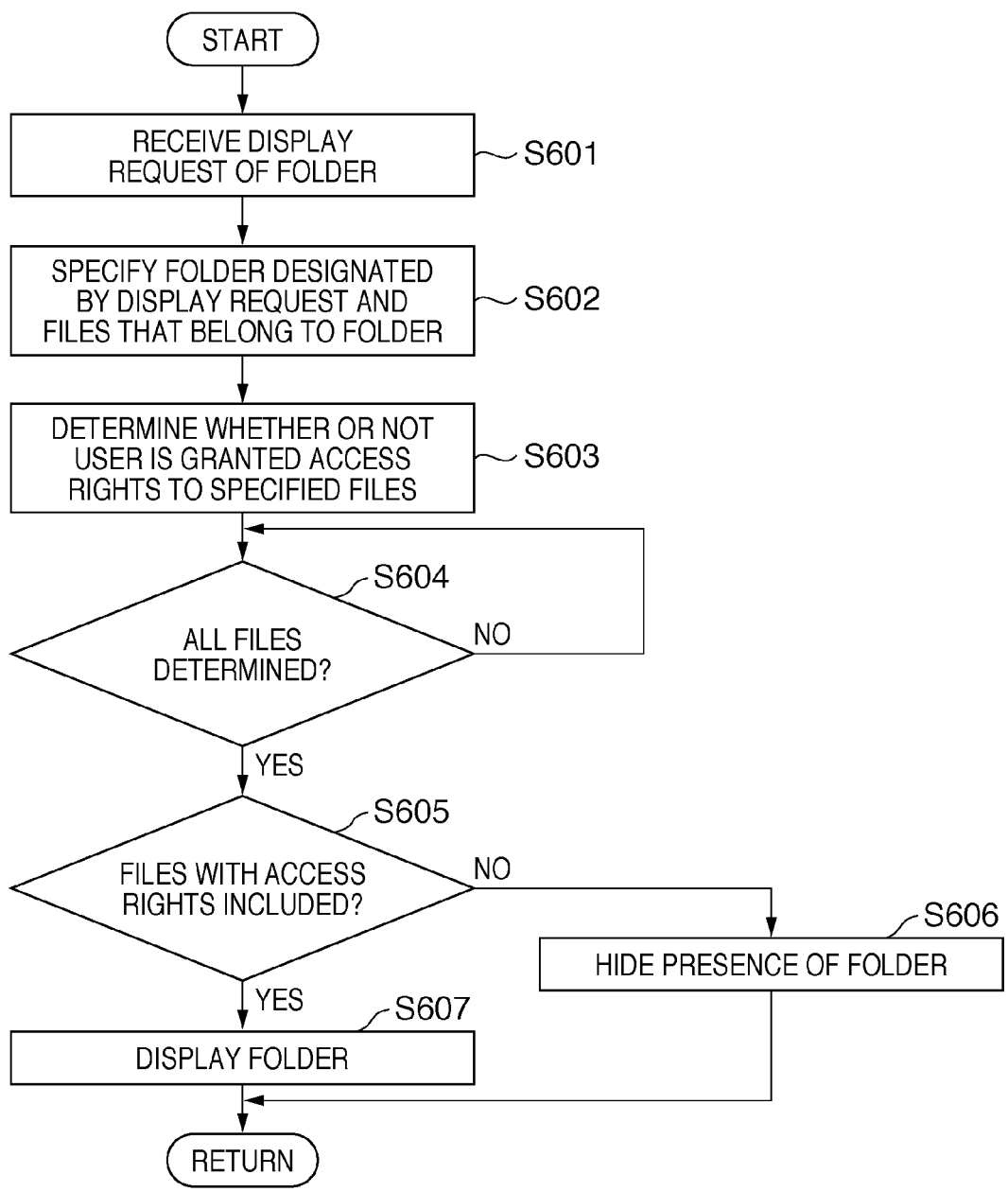
FIG. 6 is a flowchart showing an embodiment of a sequence of processing for controlling whether to display or hide each of folders that configure the hierarchical structure of folders generated by the folder generation unit 202.

FIG. 6 is a flowchart showing an embodiment of a sequence of processing for controlling whether to display or hide each of folders that configure the hierarchical structure of folders generated by the folder generation unit 202. Note that the processing shown in FIG. 6 may be repetitively executed every time a folder to which electronic files belong is traced, as shown in FIG. 4.

When a user issues a folder display request, a folder, which has not undergone folder display control processing shown in FIG. 6 yet of the folder hierarchical structure shown in FIG. 4, is selected, and a display request of the selected folder is issued to the folder display control unit 203.

In step S601, the folder display control unit 203 receives a display request of a certain folder.

In step S602, the folder display control unit 203 specifies a folder designated by the display request and electronic files that belong to that folder based on attribute information managed by the electronic file management unit 201.

The access right determination unit 205 determines in step S603 whether or not the user who issued the display request is granted access rights to the respective electronic files specified in step S602.

The folder display control unit 203 checks in step S604 if determination as to whether or not the user is granted the access right is complete for all the electronic files specified in step S602. If the unit 203 determines in step S604 that determination as to whether or not the user is granted the access right is complete for all the electronic files (YES in step S604), the process advances to step S605.

The folder display control unit 203 determines in step S605 if the electronic files specified in step S602 include those, the access rights of which are granted to the user. If the unit 203 determines in step S605 that electronic files, the access rights of which are granted to the user, are included (YES in step S605), the process advances to step S607, and the unit 203 controls display of the folder designated by the display request received in step S601.

On the other hand, if the folder display control unit 203 determines in step S605 that no electronic files, the access rights of which are granted to the user, are included (NO in step S605), the process advances to step S606 to control hiding of the folder designated by the display request received in step S601.

4. EXAMPLE

An example of the folder display control processing when the folder hierarchical structure generated by the folder generation unit 202 has the state shown in FIG. 4, and when users BBB and CCC are among those who are granted the access rights shown in FIG. 5 and issue display requests will be described below.

Figure 7A:
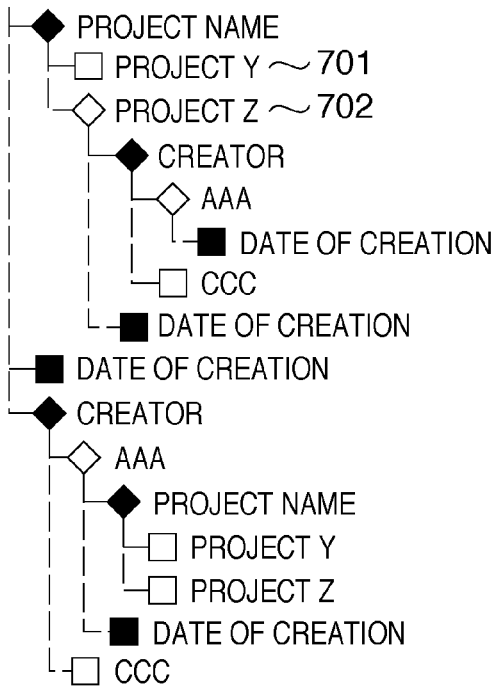
FIGS. 7A and 7B are views showing embodiments of folder display control processing.

FIG. 7A is a view showing an embodiment of the processing result of the folder display control processing when user CCC issues a display request of the folder hierarchical structure (FIG. 4).

Of the folder hierarchical structure shown in FIG. 4, three electronic files with the file names "schedule", "minutes070218", and "examination result070218" belong to a folder with a folder name "project X". However, user CCC is not granted any access rights to these electronic files (see FIG. 5). Therefore, the folder 411 with the folder name "project X" is not displayed.

Conversely, user CCC is granted access rights to electronic files (file names "research report_0210", "specification (plan)", and "project overview") which belong to folders with folder names "project Y" and "project Z" (see FIG. 5). Therefore, the folders with the folder names "project Y" and "project Z" are displayed, as denoted by reference numerals 701 and 702.

As a result, user CCC can access the folders with the folder names "project Y" and "project Z", but he or she cannot find out about the existence of the folder with the folder name "project X".

Figure 7B:
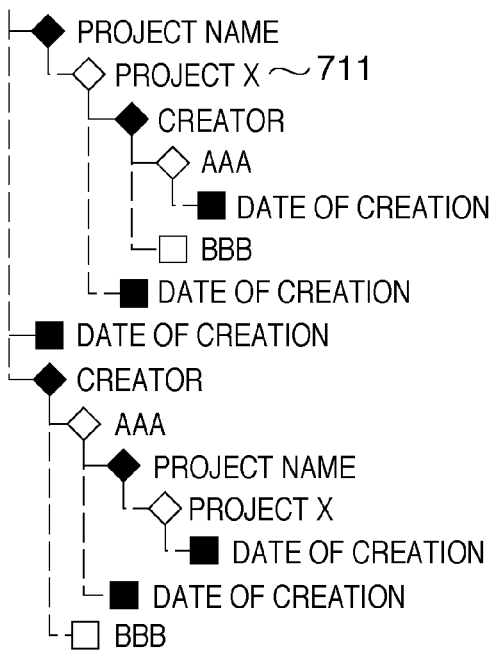

On the other hand, FIG. 7B is a view showing the processing result of the folder display control processing when user BBB issues a display request of the folder hierarchical structure (FIG. 4).

Of the folder hierarchical structure shown in FIG. 4, the electronic file with the file name "research report_0210" belongs to the folder with the folder name "project Y". However, user BBB is not granted any access rights to that electronic file (see FIG. 5). Therefore, the folder 412 with the folder name "project Y" is not displayed.

Likewise, two electronic files with the file names "specification (plan)" and "project overview" belong to the folder with the folder name "project Z". However, user BBB is not granted any access rights to these electronic files (see FIG. 5). Therefore, the folder 413 with the folder name "project Z" is not displayed.

Conversely, user BBB is granted access rights to electronic files (file names "schedule", "minutes070122", and "examination result070218"), which belong to the folder with the folder name "project X" (see FIG. 5). Therefore, the folder with the folder name "project X" is displayed, as denoted by reference numeral 711.

As a result, user BBB can access the folder with the folder name "project X", but he or she cannot find out about the existence of the folders with the folder names "project Y" and "project Z".

As can be seen from the above description, according to this first embodiment, in the file management system that can generate folders based on attribute information of electronic files, a folder can be hidden without setting any access rights for respective folders. As a result, a situation where the attribute information of a given folder leaks via its folder name can be avoided.

The first embodiment has explained the case in which the display control is executed for the folder hierarchical structure (FIG. 4) which is generated in advance by the folder generation unit 202.

However, the present invention is not limited to this embodiment. For example, the display control may also be executed for a case in which a folder is dynamically generated based on a user's display request.

Figure 8:
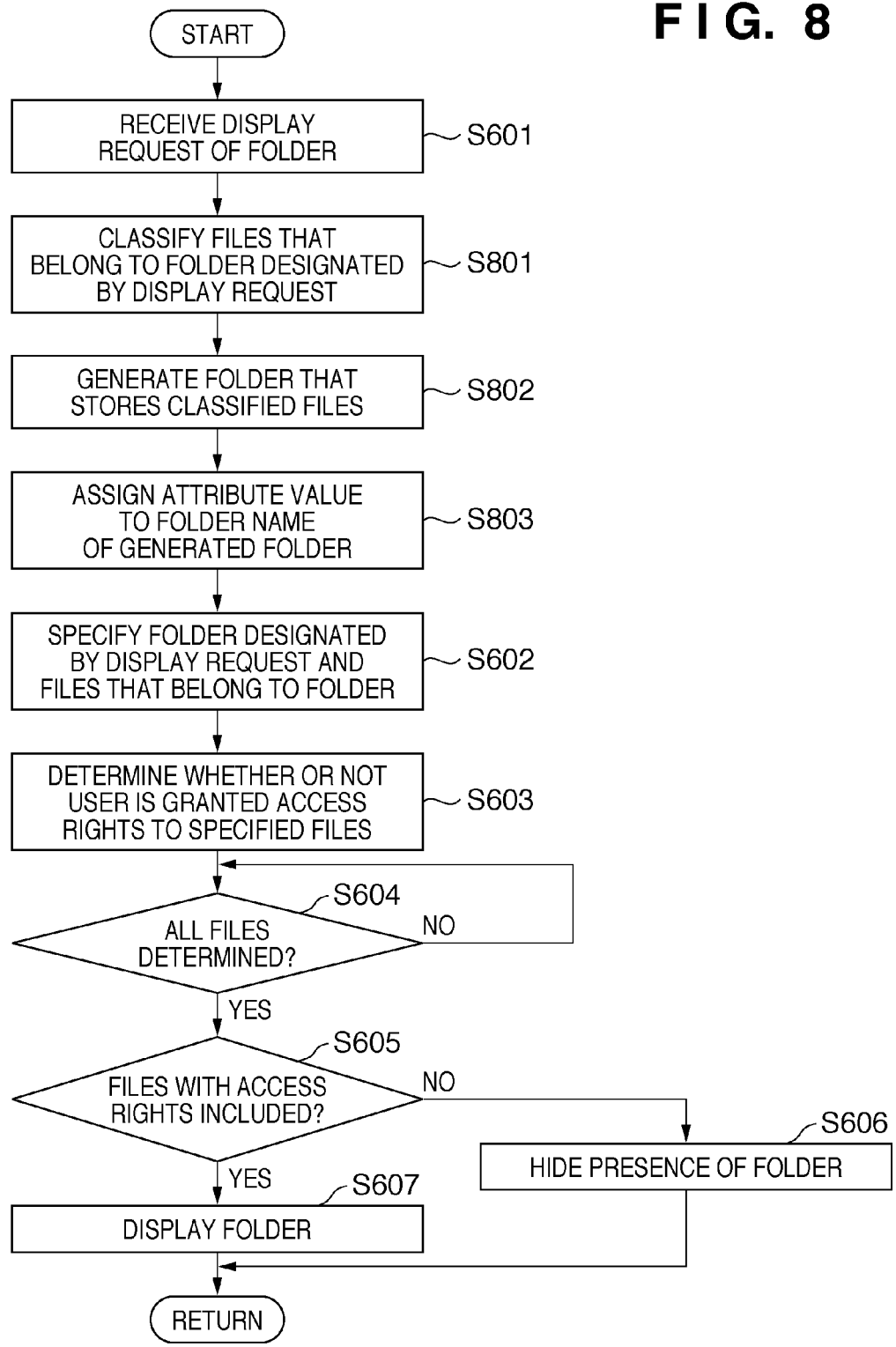
FIG. 8 is a flowchart showing an embodiment of the sequence of processing of folder display control processing by a folder display control unit 203 and access right determination unit 205 in a file management system 111 of an information processing apparatus according to the second embodiment of the present invention.

FIG. 8 is a flowchart showing a second embodiment of the sequence of folder display control processing by the folder display control unit 203 and access right determination unit 205 in the file management system 111 according to this embodiment.

FIGS. 9A to 9D show a state in which a folder is dynamically generated based on a user's display instruction for the electronic file group with the attribute information shown in FIG. 3.

The sequence of the folder display control processing in this second embodiment will be described below with reference to FIG. 8 and FIGS. 9A to 9D.

Figure 9A:
FIGS. 9A to 9D are views showing an embodiment of a state in which folders are dynamically generated based on a display instruction of a user in association with the electronic file group having attribute information shown in FIG. 3.

A state is assumed in which a folder that has, as its folder name, an attribute item "project name" is displayed, as shown in FIG. 9A, and a user issues a display request of folders that belong to that folder. As shown in FIG. 3, the attribute item "project name" includes three attribute values "project X", "project Y", and "project Z". Therefore, upon receipt of the user's display request, display requests of folders having these attribute values as their folder names are sequentially issued to the folder display control unit 203.

In step S601, the folder display control unit 203 receives a display request of the folder having, as its folder name, "project X".

In step S801, the folder display control unit 203 classifies electronic files that belong to the folder (folder name "project X") designated by the display request. In the example of FIG. 3, electronic files with file names "schedule", "minutes070122", and "examination result070218" are classified.

The folder generation unit 202 generates a folder, which stores the electronic files classified in step S801, in step S802, and assigns an attribute value ("project X") to the folder name of the generated folder in step S803.

Figure 9B:

FIG. 9B shows an example of a state in which the folder generation unit 202 generates a folder with a folder name "project X" as a lower layer of the folder with the folder name "project name".

In step S602, the folder display control unit 203 specifies a folder designated by the display request and electronic files which belong to that folder based on attribute information managed by the electronic file management unit 201.

The access right determination unit 205 determines in step S603 whether or not the user who issued the display request is granted access rights to the respective electronic files specified in step S602.

The folder display control unit 203 checks in step S604 if determination as to whether or not the user is granted the access right is complete for all the electronic files specified in step S602. If the unit 203 determines in step S604 that determination as to whether or not the user is granted the access right is complete for all the electronic files (YES in step S604), the process advances to step S605.

The folder display control unit 203 determines in step S605 if the electronic files specified in step S602 include those, the access rights of which are granted to the user. If the unit 203 determines in step S605 that electronic files, the access rights of which are granted to the user, are included (YES in step S605), the process advances to step S607, and the unit 203 controls display of the folder designated by the display request received in step S601.

On the other hand, if the folder display control unit 203 determines in step S605 that no electronic files, the access rights of which are granted to the user, are included (NO in step S605), the process advances to step S606 to control hiding of the folder designated by the display request received in step S601.

If the user who issued the display request is user CCC, the generated folder (folder name "project X") is not displayed. On the other hand, if the user is user BBB, the generated folder (folder name "project X") is displayed.

Figure 9C:
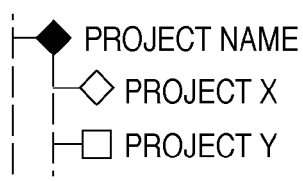

Likewise, when the folder display control unit 203 receives a display request of a folder having, as its folder name, "project Y", the folder generation unit 202 generates a folder having, as its folder name, "project Y". FIG. 9C shows an example of a state in which the folder name with the folder name "project Y" is generated as a lower layer of the folder with the folder name "project name".

If the user who issued the display request is user BBB, since he or she is not granted any access rights to electronic files that belong to the folder with the folder name "project Y", that folder is not displayed.

Conversely, if that user is user CCC, since he or she is granted access rights to electronic files that belong to the folder with the folder name "project Y", that folder is displayed.

Figure 9D:
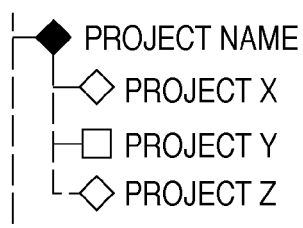

Likewise, when the folder display control unit 203 receives a display request of a folder having, as its folder name, "project Z", the folder generation unit 202 generates a folder having, as its folder name, "project Z". FIG. 9D shows an example of a state in which the folder name with the folder name "project Z" is generated as a lower layer of the folder with the folder name "project name".

Note that user BBB is not granted any access rights to electronic files that belong to the folder with the folder name "project Z". Hence, if user BBB issued the display request, that folder is not displayed.

Conversely, user CCC is granted access rights to electronic files that belong to the folder with the folder name "project Z". If user CCC issued the display request, that folder is displayed.

In this way, every time the user issues a display request, the aforementioned processing is repeated to generate a folder, and the decision whether to display or hide the folder to be generated is controlled based on the access rights granted to the user.

As can be seen from the above description, according to this embodiment, even when a folder is dynamically generated based on a display request of a user, the decision whether to display or hide the folder to be generated can be controlled based on the access rights granted to that user.

In the first embodiment, the timing of execution of the folder generation processing by the folder generation unit 202 is not particularly mentioned. However, the present invention is not particularly limited with regards to the timing of the execution of the folder generation processing.

In a third embodiment, for example, the folder generation processing may be executed at a time at which an electronic file is stored in the storage device 103 or may be executed at predetermined intervals or at predetermined times. Alternatively, a state in which the load on the overall processing of the information processing apparatus 100 is light may be monitored, and the folder generation processing may be executed when the load is light. In this way, the folder generation processing may be automatically executed.

In each of the above embodiments, when a user is granted no access right to a certain folder, the control is made to hide that folder. However, the present invention is not limited to such specific processing.

In a fourth embodiment, for example, the folder name of a folder designated by a display request may be masked, and that folder may be displayed. As a practical example, a case will be explained below wherein a folder designated by a display request is a folder with a folder name "project X", and a user who is not granted any access rights to electronic files that belong to that folder issues the display request.

In this case, the folder name is masked by information that does not evoke "project X" such as "ααα", "??????", "folder No. 1", or the like. In this way, a situation in which attribute information of electronic files leaks via a folder can be avoided.

Each of the above embodiments is premised on the fact that a folder name to be assigned to a folder generated by the folder generation unit 202 is based on attribute information of electronic files that belong to that folder. However, the present invention is not limited to such embodiments.

In a fifth embodiment, for example, a folder name may be assigned independently of attribute information of electronic files. However, in this case, a generated folder need not always be hidden. For example, assuming that a folder "classification result" is generated as a folder of the uppermost layer in FIG. 10, since this folder is generated independently of electronic files which belong to that folder, it need not always be hidden.

In this case, for this folder, determination of access rights to electronic files in lower layers (step S603 in FIGS. 6 and 8) may be skipped in the folder display control processing.

In each of the above embodiments, electronic files are classified for respective attribute items and attribute values in the folder generation processing of the folder generation unit 202. However, the present invention is not limited to such embodiments.

In sixth embodiment, for example, if electronic files are document data, they may be classified by analyzing the body text of each document and using linguistic biases. Hence, electronic files may, in some cases, be classified by certain known document classification processing.

Alternatively, if electronic files are image data, they may be classified based on similarities of feature amounts of images. Or classification processing may be executed by combining a plurality of classification processes.

In each of the above embodiments, aspects of the present invention are applied to the case in which the folder generation unit 202 generates the folder hierarchical structure. However, the present invention is not limited to such embodiments.

In seventh embodiment, for example, the present invention may be applied to a case in which a plurality of folders that are automatically generated by classifying electronic files are to be flatly or linearly displayed.

Note that the present invention may be applied to either a system made up of a plurality of devices (e.g., a host computer, interface device, reader, printer, and the like), or an apparatus consisting of a single device (e.g., a copying machine, facsimile apparatus, or the like).

In one embodiment according to the invention, a storage medium is supplied, which records a program code of software containing computer-executable instructions that implement the functions of the aforementioned embodiments to the system or apparatus. In this case, the functions are implemented when a computer (or a CPU or MPU) of the system or apparatus reads out and executes the program code stored in the storage medium. Note that the storage medium that stores the program code can comprise an embodiment of the present invention in such a case.

As the storage medium for supplying the program code, for example, a Floppy® disk, hard disk, optical disk, magneto-optical disk, CD-ROM, CD-R, magnetic tape, nonvolatile memory card, ROM, and the like may be used.

The present invention is not limited to the case in which the functions of the aforementioned embodiments are implemented when the computer executes the readout program code. For example, the present invention also includes a case in which an OS (operating system) or the like running on a computer may execute some or all of actual processes based on an instruction of the program code to implement the functions of the aforementioned embodiments.

Furthermore, the present invention also includes a case in which the functions of the aforementioned embodiments are implemented after the program code read out from the storage medium is written in a memory equipped on a function expansion board or unit, which is inserted into or connected to the computer. That is, the present invention includes a case in which, after the program code is written in the memory, a CPU or the like equipped on the function expansion board or unit executes some or all of the actual processes based on an instruction of the program code, so as to implement the functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-298597 filed on Nov. 16, 2007, which is hereby incorporated by reference herein in its entirety.

What is claimed is:

1. An information processing apparatus comprising:
a processor, the processor being able to display folders, which can classify and store electronic files according to attribute information appended to the electronic files, using folder names based on the attribute information appended to the electronic files classified in the folders; and
a memory storing instructions that, when executed, causes the information processing apparatus to:
specify a folder to be displayed and electronic files classified to the folder in response to an instruction from a user;
determine whether or not the specified folder includes electronic files;
grant access rights to the user;
generate a folder name of the specified folder based on attribute information appended to the electronic files classified to the specified folder when it is determined that the specified folder includes electronic files, the access rights of which are granted to the user;
generate a folder name of the specified folder, which is not based on the attribute information appended to the electronic files classified to the specified folder, when it is determined that the specified folder does not include any electronic files, the access rights of which are granted to the user; and
display the specified folder when the specified folder includes electronic files, the access rights of which are granted to the user, and not display the specified folder when the specified folder does not include electronic files, the access rights of which are granted to the user.

2. The information processing apparatus according to claim 1, wherein the specified folder is displayed using the generated folder name which is not based on the attribute information appended to the electronic files classified to the specified folder when the specified folder does not include electronic files, the access rights of which are granted to the user.

3. An information processing apparatus comprising:
a processor, the processor executing information processing; and
a memory storing instructions that, when executed, causes the information processing apparatus to:
generate, in response to an instruction from a user, a folder that classifies and stores electronic files in accordance with attribute information appended to the electronic files;
determine whether or not the generated folder includes electronic files;
grant access rights to the user;
assign a folder name to the generated folder based on attribute information appended to the electronic files classified to the generated folder when it is determined that the generated folder includes electronic files, the access rights of which are granted to the user;
assign a folder name to the generated folder, which is not based on the attribute information appended to the electronic files classified to the generated folder, when it is determined that the generated folder does not include any electronic files, the access rights of which are granted to the user; and
display the generated folder when the generated folder includes electronic files, the access rights of which are granted to the user, and not display the generated folder when the generated folder does not include electronic files, the access rights of which are granted to the user.

4. The information processing apparatus according to claim 3, wherein the generated folder is displayed using the assigned folder name which is not based on the attribute information appended to the electronic files classified to the generated folder when the generated folder does not include electronic files, the access rights of which are granted to the user.

5. A display control method in an information processing apparatus, which can display folders, which can classify and store electronic files according to attribute information appended to the electronic files, using folder names based on attribute information appended to electronic files classified to the folders, the method comprising:
specifying a folder to be displayed and electronic files classified to the folder in response to an instruction from a user;
determining whether or not the specified folder includes electronic files;
granting access rights to the user;
generating a folder name of the specified folder based on attribute information appended to the electronic files classified to the specified folder when it is determined that the specified folder includes electronic files, the access rights of which are granted to the user;
generating a folder name of the specified folder, which is not based on the attribute information appended to the electronic files classified to the specified folder, when it is determined that the specified folder does not include any electronic files, the access rights of which are granted to the user; and
displaying the specified folder when the specified folder includes electronic files, the access rights of which are granted to the user, and not displaying the specified folder when the specified folder does not include electronic files, the access rights of which are granted to the user.

6. A display control method comprising:
generating, in response to an instruction from a user, a folder that classifies and stores electronic files in accordance with attribute information appended to the electronic files;
determining whether or not the generated folder includes electronic files;
granting access rights to the user;
assigning a folder name to the generated folder based on attribute information appended to the electronic files classified to the generated folder when it is determined that the generated folder includes electronic files, the access rights of which are granted to the user;
assigning a folder name to the generated folder, which is not based on the attribute information appended to the electronic files classified to the generated folder, when it is determined that the generated folder does not include any electronic files, the access rights of which are granted to the user; and
displaying the generated folder when the generated folder includes electronic files, the access rights of which are granted to the user, and not displaying the generated folder when the generated folder does not include any electronic files, the access rights of which are granted to the user.

7. A non-transitory computer readable medium containing computer-executable instructions for controlling an information processing apparatus, which can display folders, which can classify and store electronic files according to attribute information appended to the electronic files, using folder names based on attribute information appended to electronic files classified in the folders, the non-transitory computer readable medium comprising:
computer-executable instructions for specifying a folder to be displayed and electronic files classified to the folder in response to an instruction from a user;
computer-executable instructions for determining whether or not the specified folder includes electronic files;
computer-executable instructions for granting access rights to the user;
computer-executable instructions for generating a folder name of the specified folder based on attribute information appended to the electronic files classified to the specified folder when it is determined that the specified folder includes electronic files, the access rights of which are granted to the user;
computer-executable instructions for generating a folder name of the specified folder, which is not based on the attribute information appended to the electronic files classified to the specified folder, when it is determined that the specified folder does not include any electronic files, the access rights of which are granted to the user; and
computer-executable instructions for displaying the specified folder when the specified folder includes electronic files, the access rights of which are granted to the user, and not displaying the specified folder when the specified folder does not include any electronic files, the access rights of which are granted to the user.

8. A non-transitory computer readable medium containing computer-executable instructions for executing a display control method, the non-transitory computer readable medium comprising:
computer-executable instructions for generating, in response to an instruction from a user, a folder that classifies and stores electronic files according to attribute information appended to the electronic files;

computer-executable instructions for determining whether or not the generated folder includes electronic files;

computer-executable instructions for granting access rights to the user;

computer-executable instructions for assigning a folder name to the generated folder based on attribute information appended to the electronic files classified to the generated folder when it is determined that the generated folder includes electronic files, the access rights of which are granted to the user;

computer-executable instructions for assigning a folder name to the generated folder, which is not based on the attribute information appended to the electronic files classified to the generated folder, when it is determined that the generated folder does not include any electronic files, the access rights of which are granted to the user; and computer-executable instructions for displaying the generated folder when the generated folder includes electronic files, the access rights of which are granted to the user, and not displaying the generated folder when the generated folder does not include any electronic files, the access rights of which are granted to the user.

\* \* \* \* \*